C. D. ENOCHS.
DRY BATTERY.
APPLICATION FILED MAY 26, 1906.
917,272.  Patented Apr. 6, 1909.
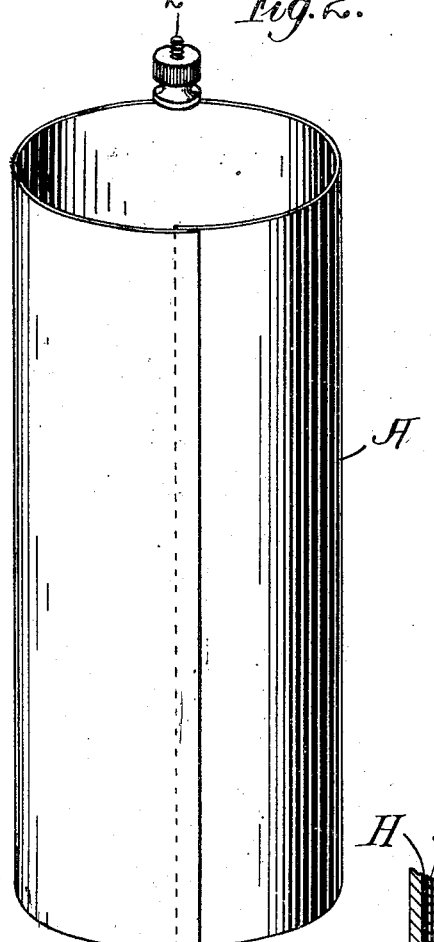
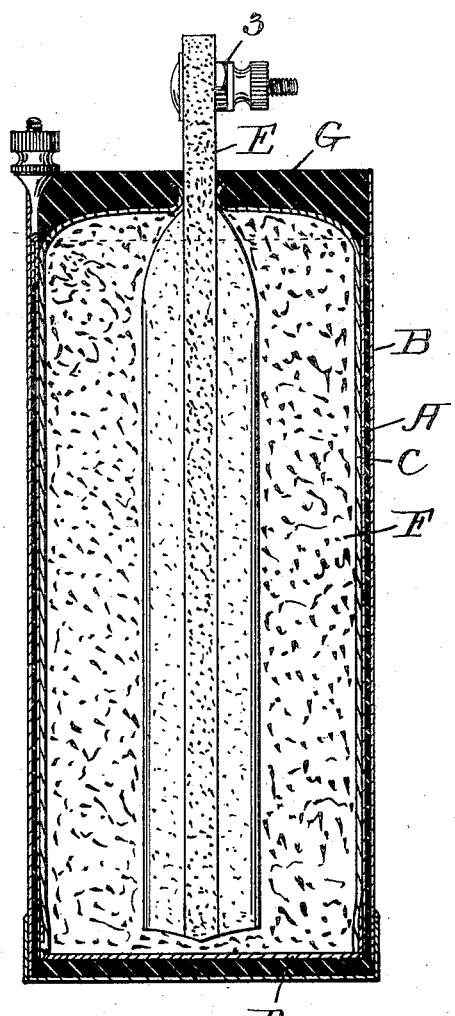
Witnesses:
Elsie M. Boesel.
H. L. Fischer.
Inventor:
Claude D. Enochs,
by: F. W. Bradbury,
Attorney.

UNITED STATES PATENT OFFICE.

CLAUDE D. ENOCHS, OF LA CROSSE, WISCONSIN.

DRY BATTERY.

No. 917,272.     Specification of Letters Patent.     Patented April 6, 1909.

Application filed May 26, 1906. Serial No. 318,894.

*To all whom it may concern:*

Be it known that I, CLAUDE D. ENOCHS, a citizen of the United States, residing at La Crosse, in the county of La Crosse and State of Wisconsin, have invented a new and useful Dry Battery, of which the following is a specification.

My invention relates to an improved dry battery and is a step forward in the art in that its construction is less expensive than those heretofore in use and its efficiency of operation is increased.

In the accompanying drawings forming part of this specification, Figure 1 is a vertical central section of my invention; Fig. 2 is a perspective view of the positive element, and Fig. 3 is a detail sectional view of the wall of the cell.

This invention comprises a positive electrode or element A, made of a thin, curved plate of zinc and provided with the customary binding post 2. The substantially circular ends of the plate overlap an eighth of an inch (more or less), although they need not overlap and the plate may be truly circular or of any other shape when so desired. The positive element is supported in a box or other appropriate receptacle B, which may be made from strawboard or other suitable material. It resembles in shape a hollow cylinder closed at its lower end and is of the required strength for the purposes desired. It is an integral part of, rather than a casing for, the cell. This receptacle is preferably made impervious to moisture by filling it with ordinary coal tar pitch H, or other waterproofing material, which is immediately emptied and allowed to drain right side up so as to leave a film on its wall and a thick settlement of pitch on its bottom. The zinc electrode is placed against the inner wall of the receptacle, thus uniting with it and reinforcing its strength. A lining C and up D (made of pulp paper or any other desirable separating medium), which have previously been moistened in an electrolytic solution of ammonia chlorid or other suitable substance, are inserted in the cell, together with a negative electrode E, made of carbon or other desired material. This negative electrode may be of any preferred form and is provided with a binding post 3 on its upper end. An appropriate interior compound F, comprising a mixture of carbon and manganese dioxid, moistened with a solution of ammonia chlorid and zinc chlorid or any other suitable mixture or active material is packed in the cell by any desired means.

The upper end of the pulp paper lining is folded over the mixture and around the carbon electrode and the cell is finally sealed at G by means of coal tar pitch or any other preferred insulating material, which is impervious to moisture, filled in the upper end of the receptacle, as illustrated, leaving the terminals of the zinc and carbon electrodes exposed.

The waterproofed receptacle retains the moisture after the zinc is entirely eaten away and protects the cell against external moisture, short circuiting and deterioration. In consequence, this cell requires the use of a less amount of zinc than cells in use prior to my invention, saves the zinc, which has heretofore been wasted—particularly opposite the sand, wax and the disk commonly used in the bottom of cells—and does not allow any moisture to escape as with other constructions now in use.

In accordance with the patent statutes, I have described the principle of operation of my invention, together with the construction which I now consider to represent the best embodiment thereof, but I desire to have it understood that the device shown is only illustrative and that the invention can be carried out by other means and the parts thereof applied in other ways than above set forth.

Having described my invention, what I claim as new and desire to protect by Letters Patent, is:—

A built up battery cell comprising a thin shell having an inner coat of water proof material forming a film on its inner wall and a thick settlement on its bottom, an electrode in the form of a thin plate placed against and united with said shell by said coat and reinforcing its strength, an inner and opposite electrode, a lining placed against the inner surface of said plate, and an electrolyte packed within said lining, the upper portion of said lining being folded over said compound and around the upper end of the inner electrode and said electrodes being sealed in said cell by said water proof material which covers the folded end of said lining.

In testimony whereof I have signed my name to this specification in the presence of two subscribing witnesses.

CLAUDE D. ENOCHS.

Witnesses:
C. H. McInnes,
H. D. Warren.